United States Patent [19]

Ohms

[11] Patent Number: 5,040,413

[45] Date of Patent: Aug. 20, 1991

[54] PNEUMATIC TIRE UNIFORMITY TESTING PROCESS AND APPARATUS

[75] Inventor: Klaus-Peter Ohms, Darmstadt-Eberstadt, Fed. Rep. of Germany

[73] Assignees: Gebr. Hofmann GmbH; Co. KG Maschinenfabrik, both of Pfungstadt, Fed. Rep. of Germany

[21] Appl. No.: 521,418

[22] Filed: May 10, 1990

[30] Foreign Application Priority Data

Aug. 31, 1989 [DE] Fed. Rep. of Germany ....... 3928921

[51] Int. Cl.$^5$ .......................................... G01M 17/02
[52] U.S. Cl. ............................................... 73/146
[58] Field of Search ................................... 73/146

[56] References Cited

FOREIGN PATENT DOCUMENTS 0265037 4/1988 European Pat. Off. .
0141533 9/1982 Japan .................................. 73/146
0141534 9/1982 Japan .................................. 73/146

OTHER PUBLICATIONS

Reifeunungleichförmigkeit—Ursache und Wirkung, May 17, 1971, Peter Max Gruber.

*Primary Examiner*—Donald O. Woodiel
*Attorney, Agent, or Firm*—Cushman, Darby & Cushman

[57] ABSTRACT

A process and an apparatus for testing the uniformity of a pneumatic tire such as a vehicle tire provide that fluctuations in tire inflation pressure are measured during a uniformity-testing measuring run in which the tire to be tested is rolled against a test surface under a given loading, with force fluctuations occurring at the contact surface therebetween, and in which a compensation value is formed from the measured fluctuations. The compensation value is combined with the measured force fluctuations thereby to eliminate force fluctuation components attributable to fluctuations in the tire inflation pressure.

2 Claims, 1 Drawing Sheet

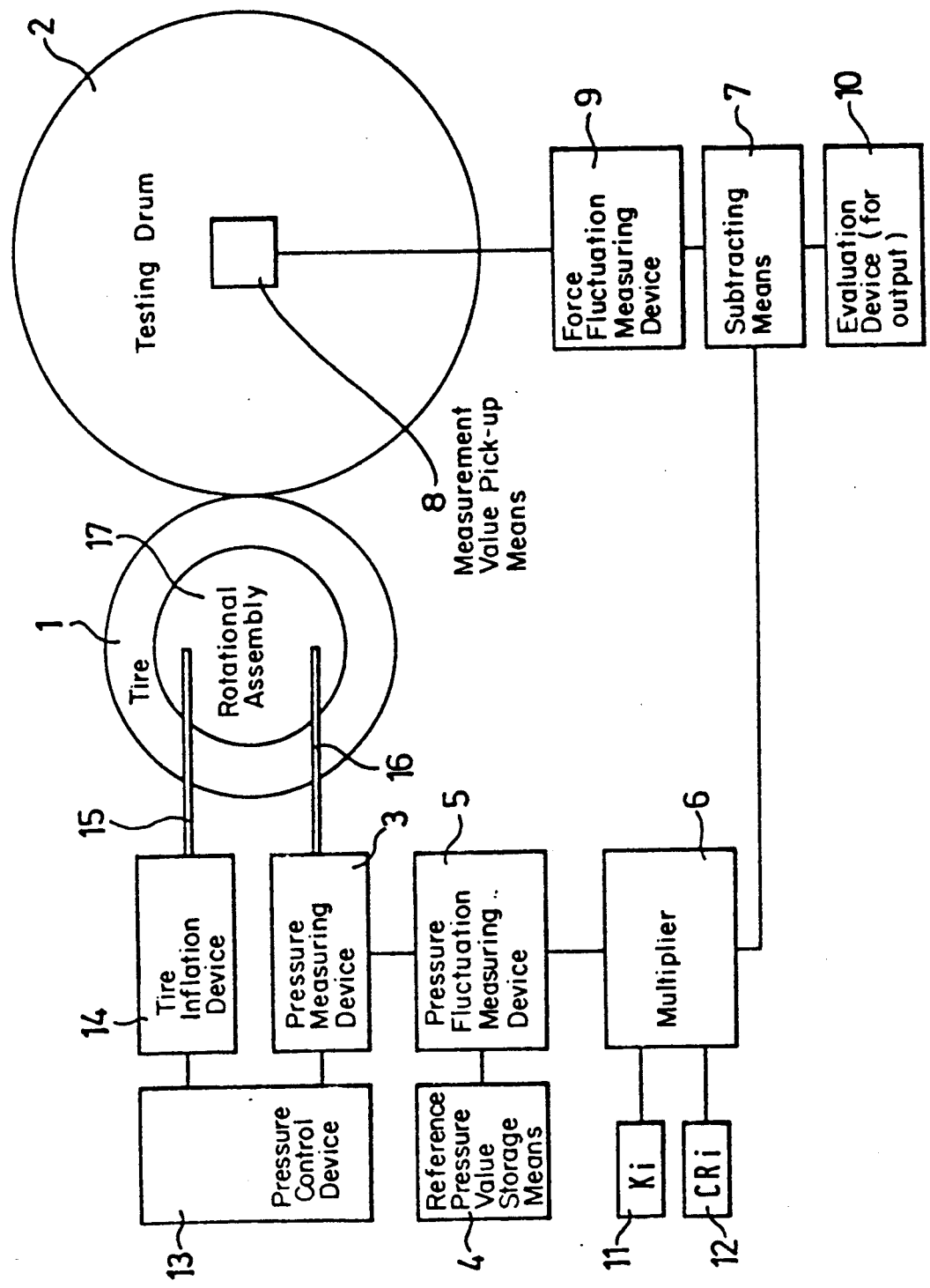

PNEUMATIC TIRE UNIFORMITY TESTING PROCESS AND APPARATUS

BACKGROUND OF THE INVENTION

For the purposes of checking the quality and in particular the degree of uniformity of a pneumatic tire such as a motor vehicle tire, a tire may be mounted on a rotary device having measuring rims. The tire can then be pressed under a given loading against a test surface which may be in the form of a rotating testing drum or an endless circulating belt. While the tire is rolled against the test surface, radial, lateral and tangential force fluctuations are measured, to provide information about the uniformity and thus the quality of the tire being tested. For example 'Automobile-Industrie' 2/71, pages 85 through 90, in an article by Peter M. Gruber 'Reifenungleichformigkeit—Ursache und Wirkung' ['Tire non-uniformity—cause and Effect'] describes processes and apparatuses for testing the uniformity of pneumatic tires.

However, the forel fluctuations that are detected in the above-discussed processes and apparatuses do not just result from irregularities or non-uniformities of the tire itself, but may include force fluctuation components which are to be attributed to alterations and variations in arrangement of the measuring system itself. For example, in spite of sensitive regulation of the inflation pressure of the tire being tested, it is not possible to maintain an absolutely constant inflation pressure in the tire throughout a measuring run. Although the inflation pressure of the tire being tested may be controlled or regulated, in which, for example, a reference may be made to EP 0 265 037 Al, it is not possible to provide an absolutely constant inflation pressure throughout the testing operation, if the equipment used for and expenditure incurred in regulating the tire inflation pressure is to be kept at a commercially viable level.

SUMMARY OF THE INVENTION

An object of the present invention is to provide a process and an apparatus for testing the uniformity of a pneumatic tire, which makes it possible to eliminate influences arising out of a fluctuation in tire inflation pressure on the measurement result, in a simple and rational manner.

Another object of the present invention is to provide a pneumatic tire uniformity testing process which involves simple low-cost operating procedures while yielding substantially reliable results.

Still another object of the present invention is to provide a pneumatic tire testing apparatus which can provide accurate tire testing results without involving high-precision pressure regulating systems.

In accordance with the present invention, in a first aspect, these and other objects are achieved by a process for testing the uniformity of a pneumatic tire, wherein a pneumatic tire, which is mounted on measuring rim means of a tire uniformity testing machine, is inflated with a regulated inflation pressure, pressed against a test surface under a given loading at a contact surface or patch, and rolled against the test surface. Force fluctuations occurring at the contact surface, and more particularly radial, lateral and tangential force fluctuations, are measured during the rolling procedure. In addition, during the measuring run, fluctuations in the tire inflation pressure are measured and detected. Then the measured values in fluctuations are multiplied by spring rates associated with the tire, to form a time-dependent compensation value signal. That signal is properly delayed and then combined with the measured force fluctuation signal, therby eliminating, in the force fluctuation signal, the force fluctuation components resulting from fluctuations in tire inflation pressure.

In accordance with the invention, in a second aspect, the foregoing and other objects are attained by a pneumatic tire uniformity testing apparatus comprising measuring rim means, on which a pneumatic tire is fitted, and a test surface adapted to perform a rotational movement and against which the tire bears at a contact surface or patch. A filling means is provided for inflating the pneumatic tire with an internal pressure, together with a pressure regulating means for regulating the inflation pressure of the tire at a reference value. A loading means causes the pneumatic tire to bear against the test surface at the contact surface or patch, under a given loading, and a measuring means measures force fluctuations at the contact surface, more specifically radial, lateral and tangential force fluctuations. The apparatus further includes a tire inflation pressure measuring means to produce an output signal proportional to the tire inflation pressure, and a pressure fluctuation measuring means connected to the tire inflation pressure measuring means to produce an output signal proportional to detected fluctuations in the inflation pressure. A multiplier is connected to the output of the pressure fluctuation measuring means, and is supplied with spring rates related to the tire being tested, the multiplier producing an output signal proportional to the product of the tire spring rates and the inflation pressure fluctuations. Connected to the output of the multiplier is a compensating circuit which in turn is also connected to the force fluctuation measuring means.

In a preferred embodiment of the invention, the compensating circuit of the apparatus may be in the form of a substracting means so that the force fluctuation components resulting from fluctuations in the tire inflation pressure are substracted from the measured force fluctuations.

The tire inflation pressure measuring means may be a measuring means which is included in the apparatus for regulating the tire inflation pressure, and it may be connected to the interior of the tire, for example, by way of a pressure line or conduit. The inflation pressure measuring means may also be a separate device which is connected to the interior of the tire by way of a pressure line or conduit.

The pressure fluctuation measuring means which is connected to the inflation pressure measuring means may separate a constant component from the measurement signal produced by the tire inflation pressure measuring means, so that all that remains in the signal is the component due to the fluctuations in pressure.

However, it is also possible for the pressure fluctuation measuring means to be connected to a reference value generator, which is already included in the pressure regulating means, whereby the deviations from a pressure reference value are used as the pressure fluctuation signal.

The tire spring rates, or the spring stiffness of the pneumatic tire, and an associated correlation factor which takes account of influencing parameters deriving from the machine used and influencing parameters derived from the tire, may be stored in suitable storage or memory means connected to the multiplier. However, it is also possible to use other input means like a keyboard, by which appropriate parameters are fed to the multiplier. The above-mentioned spring stiffness of a pneumatic tire is derived by applying a radial force to the tire to be tested, at a level so as to produce a prespecified radial deflection of the tire, and then measuring that radial force. The spring stiffness is then derived from the ratio of the measured radial force and the radial deflection imparted to the tire.

Further objects, features and advantages of the present invention will become apparent from the following description of a preferred embodiment.

BRIEF DESCRIPTION OF THE DRAWING

The accompanying single FIGURE of the drawing shows a preferred embodiment of the tire uniformity testing apparatus according to the invention.

DESCRIPTION OF THE PREFERRED EMBODIMENT

Referring to the accompanying drawing, diagrammatically shown therein is a pneumatic tire uniformity testing apparatus including a rotational assembly 17, comprising measuring rim members on which a pneumatic tire 1 to be tested for uniformity thereof is mounted during a measuring run. The rotational assembly 17 is arranged in an appropriate fashion in the remaining structure (not illustrated) of the tire uniformity testing apparatus, such structure being found for example, in the above-mentioned article in 'Automobil-Industrie'. The tire uniformity testing apparatus also includes a test surface formed in this embodiment by a rotatable testing drum as indicated at 2. The tire 1 to be tested is pressed against the testing drum 2, at a contact surface or patch, by means of a suitable loading device (not nown) which is capable or pressing the tire 1 against the surface of the testing drum 2 with a given loading. Automatic tire uniformity measuring installations which may be used in this connection are also to be found for example in 'Hofmann report 89' to which reference may be made.

The apparatus further includes a measuring value pick-up means 8 which is disposed on the axis or shaft of the testing drum 2, which is used to measure forces occuring in the contact surface or patch at which the tire 1 and the testing drum 2 are in contact with each other. The measurement value pick-up means 8 may be of any suitable configuration, like multi-component measuring hub assemblies as described in 'Hofmann News 3' or 'Hofmann News 4'. Connected to the measurement value pick-up means 8 is a force fluctuation measuring device 9 which, on the basis of the force signals supplied thereto by the output of the measuring value pick-up means 8, evaluates the force fluctuations involved, for example by separating off the constant component contained in the measured signal. Suitable evaluation circuits are to be found in the above-mentioned article from 'Automobil-Industrie' and also in above-quoted 'Holfmann News 3 and 4'.

The apparatus for inflating the tire includes a tire inflating device 14, which is connected to the interior of the tire by way of a pressure line or conduit 15, for producing the necessary pressure for inflating the tire to desired value. The inflation pressure of the tire 1 is measured and monitored by a tire inflation pressure measuring device 3 which is connected to the interior of the tire by way of a pressure line or conduit 16. The tire inflation pressure measuring device 3 has its output connected to a pressure control device 13 which also receives a suitable reference pressure value from a reference pressure value storage device 4. The pressure control device 13 then actuates the tire inflation device 14 according to the result of a comparison between the measured or actual tire inflation pressure and the reference pressure value. A suitable form of tire inflation pressure control device for a tire to be tested in this way is to be found in above-mentioned EP No. 0 264 037 Al to which reference may be hereafter be directed.

Connected to the tire inflation pressure measuring device 3 is a pressure fluctuation measuring device 5 in which the constant component is separated from the measurement signal, so that all that remains is a component of the signal corresponding to the pressure fluctuations. For that purpose, the pressure fluctuation measuring device 5 may be connected to the reference pressure value storage means 4 which provides the constant component of the tire inflation pressure.

The pressure fluctuation measuring device 5 is connected to a multiplier 6. The value of a correlation factor Ki is fed to another input of the multiplier 6. The value Ki may be stored in a storage device or memory as indicated at 11, but, as indicated above, it may also be supplied to the multiplier 6 by way of a suitable keyboard. The multiplier 6 also has an input connected to a storage device or memory 12 storing the value of radial spring stiffness CRi. That value can also be applied to the multiplier 6 by way of a suitable input unit.

The multiplier 6 performs the following multiplication operation:

$$Cri \times \Delta p \times Ki$$

in which $\Delta p$ denotes the pressure fluctuations of the tire inflation pressure. The signal corresponding to $\Delta p$ is supplied by the pressure fluctuation measuring device 5.

The product resulting from the above-indicated multiplication is a compensation parameter. The multiplier 6 thus produces output signal proportional to value of the compensation parameter. The output signal is passed to a compensating means in which the illustrated embodiment is in the form of a subtracting means 7. In the compensating means 7, the force fluctuation measurement signal supplied by the force fluctuation measuring device 9 is combined with the output signal from the multiplier 6 in such a way that force fluctuation components, which are contained in the measured force fluctuation signal, attributed to fluctuations in the tire inflation pressure are eliminated. In the illustrated embodiment, that operation is effected in the subtracting means 7 by virtue of the output signal of the multiplier 6 being substracted from the output signal of the force fluctuation measuring device 9.

As its output signal, the subtracting means 7 supplies a force fluctuation measuring signal without the force fluctuation components attributed to fluctuations in the tire inflation pressure during the measuring run. As the force fluctuations are continuously measured during the measuring run, as the tire inflation pressure is constantly monitored by the tire inflation pressure measuring means 3, and as the corresponding pressure fluctuation measurement signal is produced under those circumstances, the above configuration providesd an association in respect to time between the force fluctuation measurement signal supplied by the force fluctuation measureing device 9 and the compensation signal which is supplied as the output signal from the multiplier 6.

The output signal from the compensating circuit 7, which in the illustrated embodiment is in the form of a subtracting means, is passed to an evaluation device 10 in which the degree of uniformity of the tire 1 being tested is assessed in conventional manner.

The entire measuring and evaluation procedure described above may be carried out using analog equipment. However, using both analog and digital equipment is preferred, with analog-digital converters placed at appropriate locations between the measuring devices and the evaluation stages of the apparatus. For example, an analog-digital converter may be provided between the pressure fluctuation measuring device 5 and the multiplier 6. likewise, an analog-digital converter may be disposed between the force fluctuation measuring device 9 and the compensating circuit or substracting means 7. It will be appreciated that the fluctuations in pressure and the fluctuations in forced may also be ascertained in digital form, in which case analog-digital converters are to be suitably disposed upstream of the pressure fluctuation measuring device 5 and the force fluctuation measuring device 9.

Because the compensation circuit 7 supplies an output signal for the evaluation device 10, from which force fluctuation components resulting from fluctuations in tire inflation pressure have been removed, regulation of the tire inflation pressure only involves a low level or regulating expenditure and inexpensive equipment. There is, therefore, no need to use a high-grade system for regulating the tire inflation pressure.

It may be noted at this point that, in the above-described and illustrated embodiment, force measurements are effected by means of a measurement value pick-up device 8 which is operatively disposed at the axis of the testing drum 2. It is also possible, however, for the measurement value pick-up device to be placed in the region of the rotational assembly 17 and, in particular, at the axis of rotation of the tire 1 to be tested.

It will be appreciated that the above-described apparatus and procedure have been set forth solely by way of example and illustration of the principles of the present invention and that various modifications and alternations may be made without departing from the spirit and scope of the invention.

I claim:

1. A measurement process for testing uniformity of a pneumatic tire comprising:
   mounting a pneumatic tire to be tested on a measuring rim of a tire uniformity testing machine;
   inflating the tire to an inflation pressure;
   regulating the pressure of the tire at an inflation pressure;
   pressing the tire against a test surface with a given loading at a contact surface;
   rolling the tire against the test surface;
   measuring force fluctuations occurring at the contact surface to produce a measured force fluctuation signal;
   measuring tire inflation pressure fluctuations during the measurement process and
   multiplying the tire inflation pressure fluctuations by spring rates associated with the tire to form a time-dependent compensation value signal; and
   subtracting the compensation value signal from the measured force fluctuation signal for eliminating, in the measured force fluctuation signal, signal components resulting from fluctuations in the tire inflation pressure.

2. Apparatus for testing the uniformity of a pneumatic tire comprising:
   a measuring rim on which the pneumatic tire to be tested is adapted to be fitted;
   means for placing a movable test surface against the pneumatic tire to form a contact surface therebetween;
   inflation means for inflating the pneumatic tire with an inflation pressure;
   pressure regulating means for regulating the tire inflation pressure about a reference value;
   loading means for applying a predetermined load between the pneumatic tire and the contact surface;
   measuring means for measuring force fluctuations occurring at the contact surface during a measuring run and producing a corresponding output signal;
   tire inflation pressure measuring means for measuring the tire inflation pressure and in response, for producing an output signal proportional to the pressure in the tire;
   pressure fluctuation measuring means connected to the tire inflation pressure measuring means and operable to produce an output signal proportional to the detected pressure fluctuations;
   multiplying means connected to the output of the pressure fluctuation measuring means;
   means for supplying the multiplying means with the spring rates associated with the tire being tested, said multiplying means producing an output signal, in response thereto, proportional to the product of the tire spring rates and the pressure fluctuations; and
   subtracting means connected to the output of the multiplying means and connected to the measuring means for subtracting the output signal from said multiplying means from the output signal from said measuring means.

* * * * *